(12) United States Patent
Miller

(10) Patent No.: US 11,175,744 B2
(45) Date of Patent: Nov. 16, 2021

(54) HOLOGRAPHIC PROJECTION SYSTEM

(71) Applicant: Starport Inc., Irvine, CA (US)

(72) Inventor: Daniel E. Miller, Irvine, CA (US)

(73) Assignee: Starport Inc., Irvine, CA (US)

( * ) Notice: Subject to any disclaimer, the term of this patent is extended or adjusted under 35 U.S.C. 154(b) by 0 days.

(21) Appl. No.: 17/168,489

(22) Filed: Feb. 5, 2021

(65) Prior Publication Data

US 2021/0157413 A1    May 27, 2021

Related U.S. Application Data

(63) Continuation of application No. PCT/US2019/046331, filed on Aug. 13, 2019.

(60) Provisional application No. 62/718,830, filed on Aug. 14, 2018.

(51) Int. Cl.
| | |
|---|---|
| *G03B 21/28* | (2006.01) |
| *G06F 3/01* | (2006.01) |
| *G03H 1/22* | (2006.01) |
| *G10L 15/22* | (2006.01) |
| *H04R 1/08* | (2006.01) |

(52) U.S. Cl.
CPC .............. *G06F 3/017* (2013.01); *G03B 21/28* (2013.01); *G03H 1/2294* (2013.01); *G06F 3/016* (2013.01); *G10L 15/22* (2013.01); *G10L 2015/223* (2013.01); *H04R 1/08* (2013.01)

(58) Field of Classification Search
USPC ........................................................ 345/156
See application file for complete search history.

(56) References Cited

U.S. PATENT DOCUMENTS

| | | | |
|---|---|---|---|
| 6,639,631 B1 * | 10/2003 | Hall, Jr. | ................... H04N 9/31 |
| | | | 348/744 |
| 2010/0103246 A1 | 4/2010 | Schwerdtner et al. | |
| 2010/0157399 A1 * | 6/2010 | Kroll | ..................... G03H 1/2205 |
| | | | 359/11 |

(Continued)

FOREIGN PATENT DOCUMENTS

| | | |
|---|---|---|
| CN | 107351082 A | 11/2017 |
| KR | 101381656 B1 | 4/2014 |
| WO | 2005099386 A2 | 10/2005 |

OTHER PUBLICATIONS

International Search Report and Written Opinion, PCT/US2019/046331, dated Nov. 12, 2019.

*Primary Examiner* — Leonard Saint Cyr
(74) *Attorney, Agent, or Firm* — Entralta P.C.; Justin G. Sanders

(57) ABSTRACT

A holographic projection system is disclosed for cost-effectively generating "real image" holographic images. In at least one embodiment, the system provides an at least one primary image source configured for projecting a primary image via an at least one light ray. A computing device is in communication with the at least one primary image source and configured for providing the primary image to be subsequently projected by the at least one primary image source. A curved reflector is positioned and configured for receiving and reflecting the at least one light ray toward a focal point of the reflector, the at least one reflected light ray converging at an image point so as to create a hologram of the projected primary image at the image point, with said hologram being viewable by an at least one observer.

20 Claims, 5 Drawing Sheets

(56) References Cited

U.S. PATENT DOCUMENTS

| | | | |
|---|---|---|---|
| 2011/0019112 A1* | 1/2011 | Dolgoff | H04N 13/305 |
| | | | 349/8 |
| 2014/0085436 A1 | 3/2014 | Page et al. | |
| 2015/0362734 A1* | 12/2015 | Moser | G03H 1/0252 |
| | | | 359/3 |
| 2016/0037146 A1* | 2/2016 | McGrew | G02B 27/0172 |
| | | | 606/27 |
| 2016/0291544 A1* | 10/2016 | Kroll | G03H 1/32 |
| 2017/0163937 A1 | 6/2017 | McNelley et al. | |
| 2018/0217554 A1* | 8/2018 | Kroll | G02B 26/0875 |

\* cited by examiner

HOLOGRAPHIC PROJECTION SYSTEM

RELATED APPLICATIONS

This application is a continuation application and so claims priority pursuant to 35 U.S.C. § 120 to international application number PCT/US2019/046331, filed on Aug. 13, 2019, which itself claims priority pursuant to 35 U.S.C. § 119(e) and is entitled to the filing date of U.S. provisional patent application Ser. No. 62/718,830, filed on Aug. 14, 2018. The contents of the aforementioned applications are incorporated herein by reference.

BACKGROUND

The subject of this patent application relates generally to holographic displays, and more particularly to a holographic projection system configured for cost-effectively generating "real image" holographic images.

Applicant(s) hereby incorporate herein by reference any and all patents and published patent applications cited or referred to in this application.

By way of background, existing holographic display devices suffer from a number of issues. Many such devices require a variety of components including beam splitters, specialized black mirrors, expensive lenses and multiple pieces that must work in conjunction to generate a holographic image—which not only increases the cost of such devices, but also the size. Most other holographic display devices utilize the Pepper's Ghost effect, where the holographic image is displayed behind a film or glass, creating a "virtual image" instead of a "real image" (as per the laws of reflection, a "real image," in addition to having its ordinary meaning, is shown in front of a reflective surface, as opposed to a "virtual image," which resides behind the reflective surface). Such virtual images are typically less ideal than real images, as the reflective surface acts as a barrier that prevents the viewer/user from "touching" or otherwise interacting directly with the virtual images.

Other holographic display devices use a combination of convex and plane reflectors in order to generate a real image; however, such components increase the complexity of the devices. For example, in at least one such version, the image or screen (as the light source) is projected onto a reflective beam splitter at an angle; the angled beam splitter reflects that image onto a concave mirror (or retro reflective surface); and the concave mirror projects the image through the beam splitter glass out to the viewer's eyes.

Other devices capable of generating augmented or holographic images use three-dimensional glasses or a mobile device to "see through" and interact with the images. Other computer generated holographic images demand colossal computing power. For example, lenticular display holographic images suffer from low quality because of very large data transfers, which also causes latency in transfers and limited viewing angles.

Thus, there remains a need for a holographic projection system configured for cost-effectively generating "real image" holographic images. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a holographic projection system configured for cost-effectively generating "real image" holographic images. In at least one embodiment, the system provides an at least one primary image source configured for projecting a primary image via an at least one light ray. A computing device is in communication with the at least one primary image source and configured for providing the primary image to be subsequently projected by the at least one primary image source. A curved reflector is positioned and configured for receiving and reflecting the at least one light ray toward a focal point of the reflector, the at least one reflected light ray converging at an image point so as to create a hologram of the projected primary image at the image point, with said hologram being viewable by an at least one observer.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
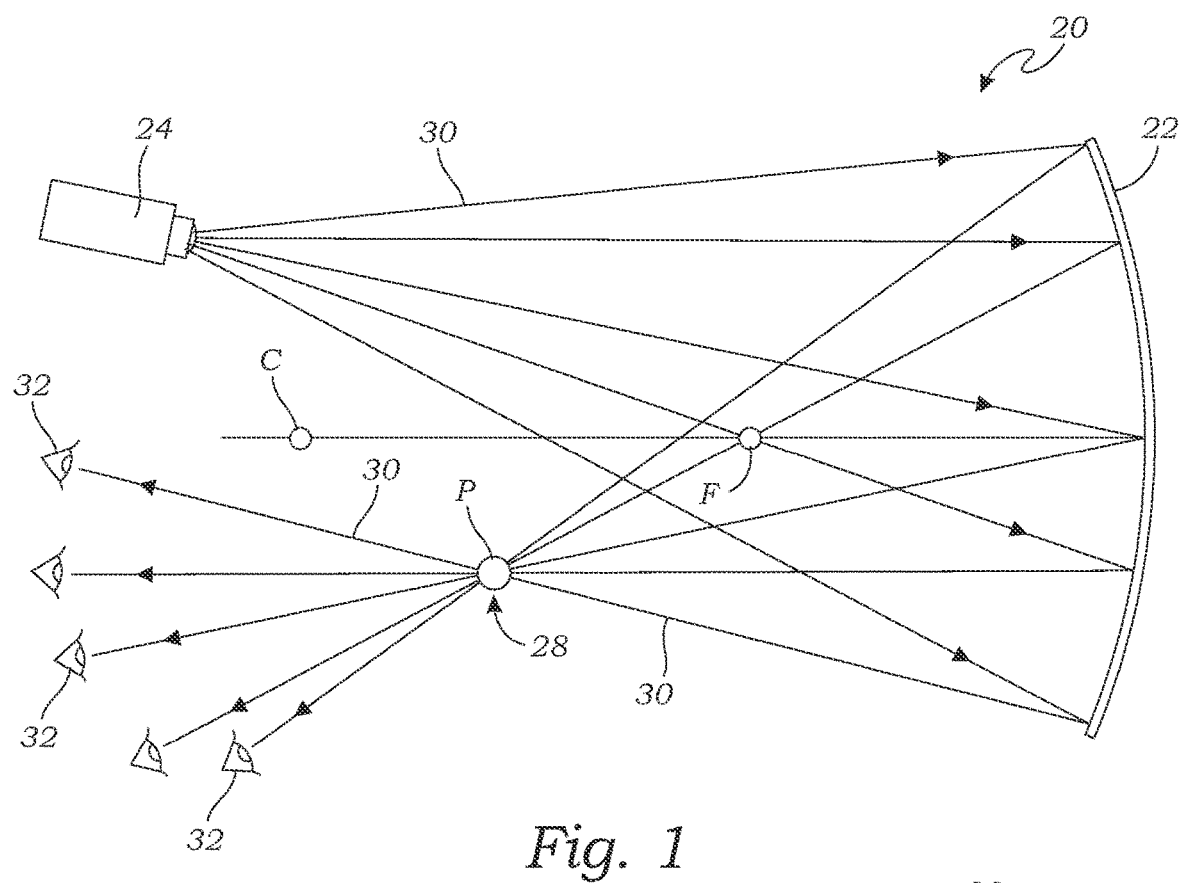
FIGS. 1 and 2 are plan view diagrammatic illustrations of an exemplary holographic projection system, in accordance with at least one embodiment.
Figure 2:
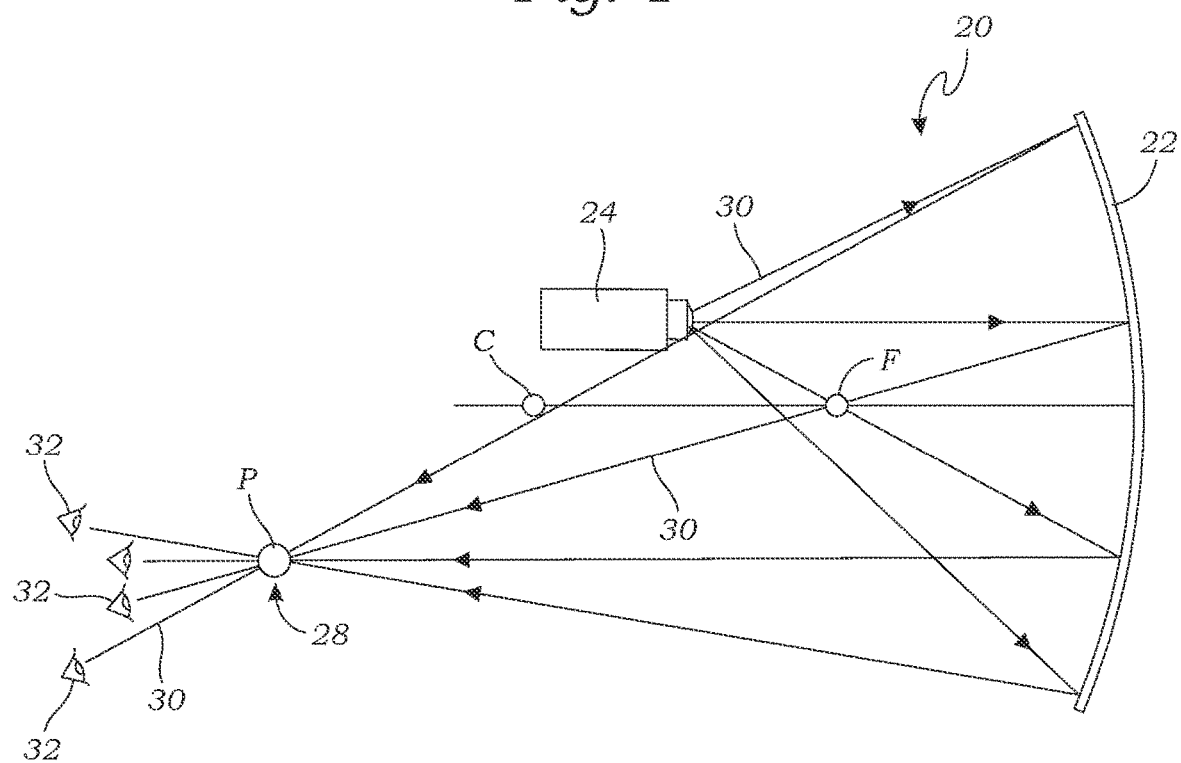

Turning now to FIGS. 1 and 2, there are shown plan view diagrammatic illustrations of an exemplary holographic projection system 20, in accordance with at least one embodiment. In at least one embodiment, the system 20 provides a curved reflector 22 and an at least one primary image source 24 configured for generating a primary image 26 (i.e., both still and moving images, as well as both two-dimensional and three-dimensional images) using light, with the at least one primary image source 24 being positioned relative to the reflector 22 for producing a "real image" version of the primary image 26 (hereinafter referred to as a hologram 28 for simplicity purposes). Before getting into the details of the system 20, FIGS. 1 and 2 illustrate exemplary positions of the at least one primary image source 24 relative to the reflector 22 for generating the hologram 28. It should be noted that these exemplary positions are just that, and are merely being shown in order to illustrate the general functionality of the system 20. Thus, in further embodiments, the at least one primary image source 24 could be positioned elsewhere relative to the reflector 22, so long as the system 20 is capable of substantially carrying out the functionality described herein. In at least one embodiment, the primary image source 24 is positioned in front of the reflector 22 and projects the primary image 26 by emitting one or more light rays 30 (in a range of directions, depending on how focused the light is), which will strike the reflector 22. In at least one alternate embodiment, where the reflector 22 is transparent or semi-transparent, the primary image source 24 may be positioned behind the reflector 22. In each embodiment, each individual light ray 30 that strikes the reflector 22 will reflect according to the law of reflection. Upon reflecting, the light rays 30 will converge at a point (known as the image point P), which is where the hologram 28 of the projected primary image 26 is created. Once the reflected light rays 30 reach the image point P, they begin to diverge, with each light ray 30 being capable of assisting an individual observer 32 in viewing the hologram 28. Regardless of the location of a given observer 32 relative to the reflector 22, the observer 32 will see a light ray 30 passing through the image point P (i.e., where the hologram 28 is located). To view the hologram 28, the observer 32 must line their sight up with the image point P in order to see the hologram 28 via the reflected light ray 30. As illustrated in FIGS. 1 and 2, not all observers 32 who are viewing the hologram 28 will sight along the same geometrical line of sight. The precise direction of the sight line depends on the location of the primary image source 24 and/or the direction of the at least one light ray 30 emanating therefrom, the location of the observer 32, and the dimensions of the reflector 22—yet all of the sight lines (i.e., the light rays 30), regardless of their direction, will pass through the image point P.

If the primary image source 24 and/or the at least one light ray 30 emanating therefrom is located at a different location relative to the reflector 22, the same principles apply. Again, the image point P is the location where the reflected light rays 30 appear to diverge from. Thus, by determining the path that the light rays 30 take after being reflected off of the reflector 22, the image point P can be identified. Generally speaking, when the primary image source 24 and/or the at least one light ray 30 emanating therefrom is positioned beyond a center of curvature C of the reflector 22 (as illustrated in FIG. 1), the resulting image point P (and, in turn, the hologram 28) is located between the center of curvature C and a focal point F of the reflector 22. Alternatively, when the primary image source 24 and/or the at least one light ray 30 emanating therefrom is positioned between the center of curvature C and the focal point F (as illustrated in FIG. 2), the image point P (and, in turn, the hologram 28) is located beyond the center of curvature C. Thus, depending on the dimensions of the reflector 22, the general location of the at least one observer 32, and the desired use of the system 20 (as discussed further below), the position of the at least one primary image source 24 may be selectively adjusted in order to create the hologram 28 at the desired/optimal viewing location. In each such embodiment, the hologram 28 is created at a location in front of the reflector 22 (rather than behind the reflector 22), such that the observer 32 may interact with the hologram 28 without any barriers therebetween, in at least one embodiment (as discussed further below).

As mentioned above, the at least one primary image source 24 is configured for generating the primary image 26 using light. In at least one embodiment, the at least one primary image source 24 is a projector (FIGS. 1-5, 7 and 8). In at least one alternate embodiment, the at least one primary image source 24 is a display screen (FIG. 6)—or a device that provides a display screen—such as a television screen, computer monitor, mobile phone, smartphone, laptop computer, tablet computer, personal data assistant, gaming device, wearable device, etc. In still further embodiments, the at least one primary image source 24 may be any other device (or combination of devices), now known or later developed, capable of generating the primary image 26 using light. In at least one embodiment (not shown), the at least one primary image source 24 is in communication with a computing device configured for providing the primary image 26 to be subsequently generated by the primary image source 24. In at least one further embodiment, the computing device and the at least one primary image source 24 are one and the same. In that regard, it should be noted that the term "computing device" is intended to include any type of computing or electronic device, now known or later developed, capable of substantially carrying out the functionality described herein—such as desktop computers, mobile phones, smartphones, laptop computers, tablet computers, personal data assistants, gaming devices, wearable devices, etc. As such, the system 20 should not be read as being limited to use with any one particular type of computing or electronic device, even though certain exemplary devices may be mentioned or shown herein for illustrative purposes.

In at least one embodiment, the reflector 22 is constructed out of a reflective material, such as acrylic, plexiglass, glass, plastic, polymer, reflective film or projector film, for example. In at least one further embodiment, the reflector 22 is constructed out of a non-reflective material that is coated with a reflective substance, such as a reflective paint for example. In still further embodiments, the reflector 22 may be constructed out of any other material (or combination of materials), now known or later developed, capable of reflecting the light rays 30 from the primary image source 24 so as to create the hologram 28. In at least one still further embodiment, the reflector 22 is a curved television having a reflective display screen. In at least one embodiment, the reflector 22 is relatively dark in color, so as to enhance the colors of the hologram 28. In at least one alternate embodiment, the reflector 22 is transparent or translucent, with a relatively dark background material positioned directly behind the reflector 22. In at least one such embodiment, where the reflector 22 (or a material positioned directly behind the reflector 22) is relatively dark in color, the primary image 26 produced by the primary image source 24 also has a relatively dark background color (preferably black), so as to reduce any reflective noise in the resulting hologram 28 (i.e., undesired reflections other than the hologram 28 itself) and to also make the hologram 28 better appear as if it is floating in front of the reflector 22 (since the dark colored background of the projected primary image 26 will appear transparent when projected against the dark colored reflector 22). In still further embodiments, the reflector 22 (or a material optionally positioned directly behind the reflector 22) may have any other color or shade of color, now known or later developed—dependent at least in part on the desired use of the system 20 and the hologram 28 to be displayed.

As mentioned above, the reflector 22 is curved (i.e., curved and/or concave). In at least one embodiment, the reflector 22 may take on a variety of curved shapes—including but not limited to spherical, semi-spherical, quarter-spherical, cylindrical, partial cylindrical (such as a half-cylinder, for example), etc.—dependent at least in part on the desired use of the system 20 and the hologram 28 to be displayed. Thus, the sizes, shapes and dimensions of the reflector 22 as depicted in the drawings (and as described herein) are merely exemplary. In further embodiments, the reflector 22 may take on any other size, shape and/or dimensions, now known or later developed, so long as the system 20 is capable of substantially carrying out the functionality described herein. It has been found that a reflector 22 having a parabolic curve causes the hologram 28 to be positioned further away from the reflector 22, while a reflector 22 having a cylindrical curve causes the hologram 28 to be positioned relatively closer to the reflector 22, but also creates a relatively wider viewing angle for observers 32. For example, where the reflector 22 has a half-cylindrical shape, the viewing angle is approximately 180 degrees; where the reflector 22 has a cylindrical shape, the viewing angle is approximately 360 degrees; where the reflector 22 has a semi-spherical shape, the viewing angle is approximately 360 degrees; where the reflector 22 has a quarter-spherical shape, the viewing angle is approximately 180 degrees; and where the reflector 22 has a conical shape, the viewing angle is approximately 360 degrees. In most embodiments, the preferred viewing angle is approximately 90 degrees—though, again, it will ultimately depend on the size, shape and dimensions of the reflector 22, as well as the position of the at least one primary image source 24 relative to the reflector 22. Again, the specific size, shape and dimensions of the reflector 22 is dependent at least in part on the desired use of the system 20 and the hologram 28 to be displayed, as discussed further below.

Figure 3:
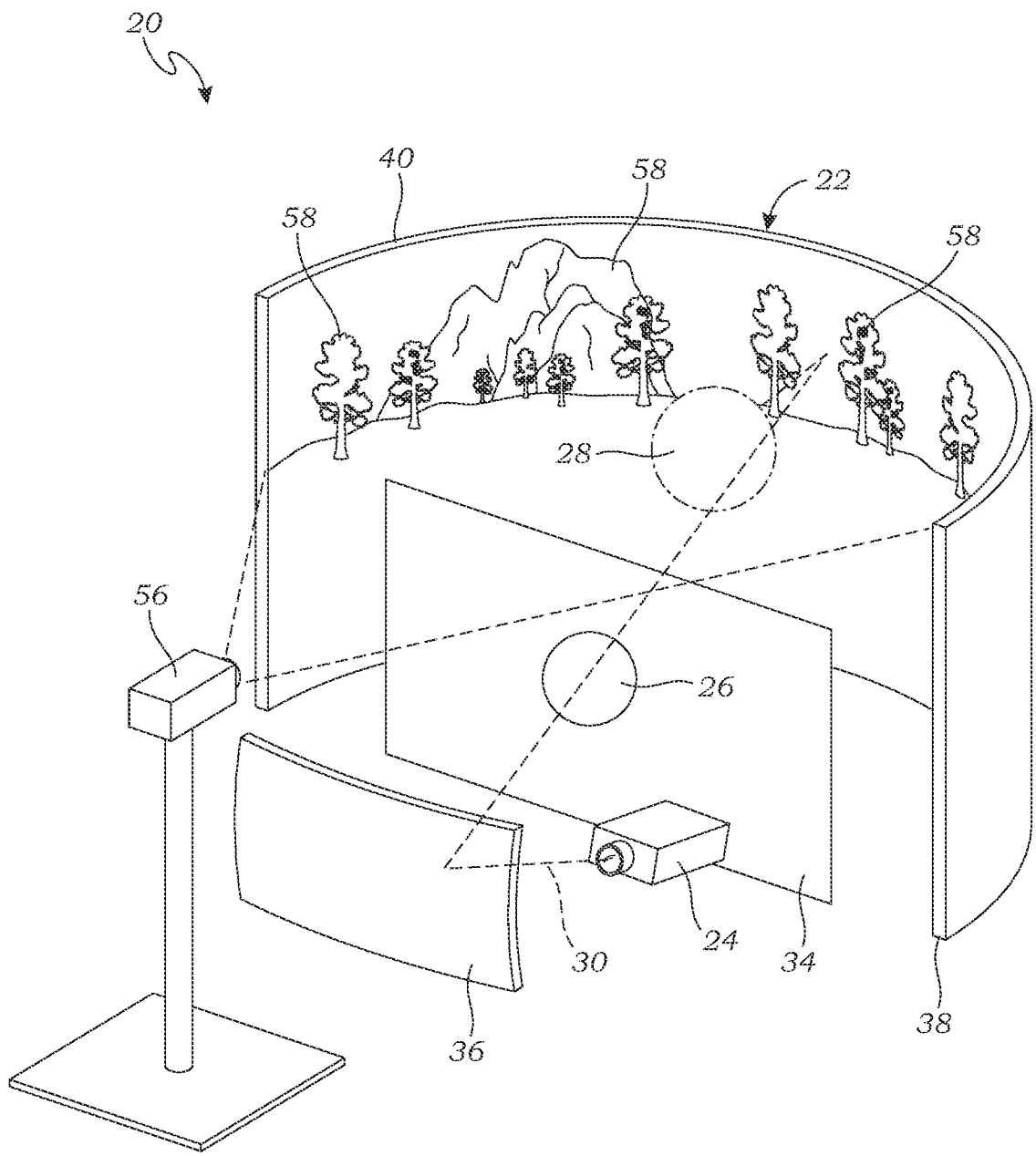
FIG. 3 is a perspective view of a further exemplary holographic projection system, in accordance with at least one embodiment.
Figure 6:
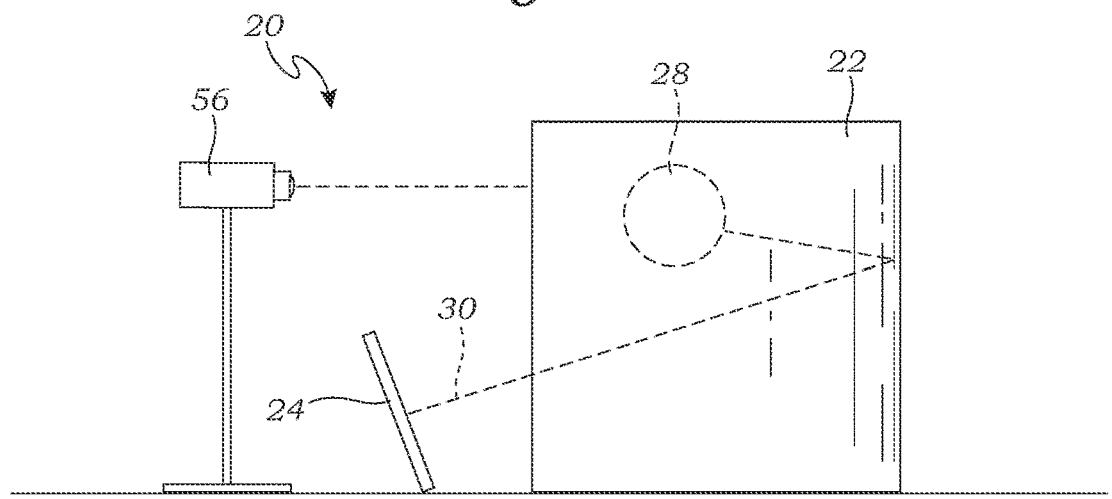
Figure 7:
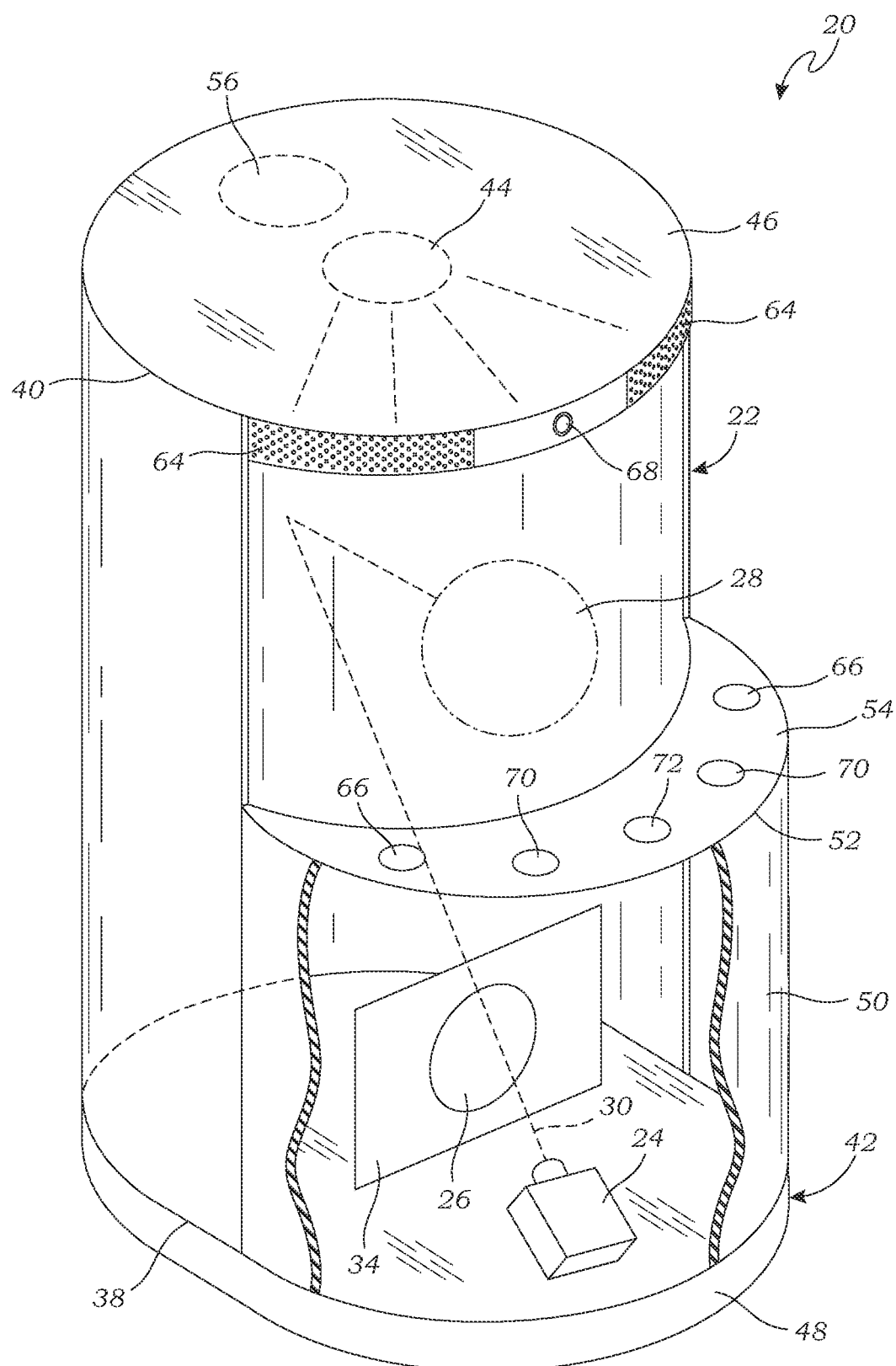
FIGS. 7 and 8 are perspective views of still further exemplary holographic projection systems, in accordance with at least one embodiment.

In at least one embodiment, as illustrated best in FIGS. 3 and 7, where the at least one primary image source 24 is a projector, the system 20 provides a projection film 34 positioned substantially between the primary image source 24 and the reflector 22 (i.e., as defined by the path of the at least one light ray 30 emanating from the at least one primary image source 24), such that the at least one light ray 30 from the primary image source 24 passes through the projection film 34 before being reflected off of the reflector 22. In such embodiments, the projection film 34 is configured for enhancing the quality of the primary image 26 which, in turn, enhances the quality of the resulting hologram 28. In at least one such embodiment, the projection film 34 is relatively dark in color, such as black for example. In still further embodiments, the projection film 34 may have any other color or shade of color, now known or later developed—dependent at least in part on the desired use of the system 20 and the hologram 28 to be displayed. In at least one embodiment, the projection film 34 is substantially planar; however, in at least one alternate embodiment, the projection film 34 is substantially curved. In at least one such alternate embodiment, the projection film 34 is curved so as to provide the hologram 28 with different viewing perspectives (depending on which angle the at least one observer 32 is viewing the hologram 28 from), much like a real three-dimensional object would have. For example, in at least one such embodiment, where the hologram 28 is of a human face, an observer 32 viewing the hologram 28 from the front would see the front of the human face; an observer 32 viewing the hologram 28 from the left side would see the right side of the human face; and an observer 32 viewing the hologram 28 from the right side would see the left side of the human face. In that regard, it should be noted that the sizes, shapes and dimensions of the projection film 34—as well as the positions of the projection film 34 relative to the at least one primary image source 24 and the reflector 22—as depicted in the drawings (and as described herein) are merely exemplary. In further embodiments, the reflector 22 may take on any other size, shape and/or dimensions, now known or later developed, and may be positioned and/or arranged elsewhere relative to the at least one primary image source 24 and the reflector 22, so long as the system 20 is capable of substantially carrying out the functionality described herein. In at least one further embodiment, as illustrated in FIG. 6, where the at least one primary image source 24 is a display screen, the projection film 34 may be omitted.

As mentioned above, depending on the dimensions of the reflector 22, the general location of the at least one observer 32, and the desired use of the system 20, the position of the at least one primary image source 24 may be selectively adjusted in order to create the hologram 28 at the desired/optimal viewing location. Not only can the position of the hologram 28 vary relative to the reflector 22, but the size of the hologram 28 may vary as well—depending on the dimensions of the reflector 22 and the position of the at least one primary image source 24 relative to the reflector 22. In other words, the system 20 is capable of generating holograms 28 of virtually any size. Thus, the position of the at least one primary image source 24 relative to the reflector 22 may vary from embodiment to embodiment—dependent at least in part on the desired use of the system 20 and the hologram 28 to be displayed.

Figure 4:
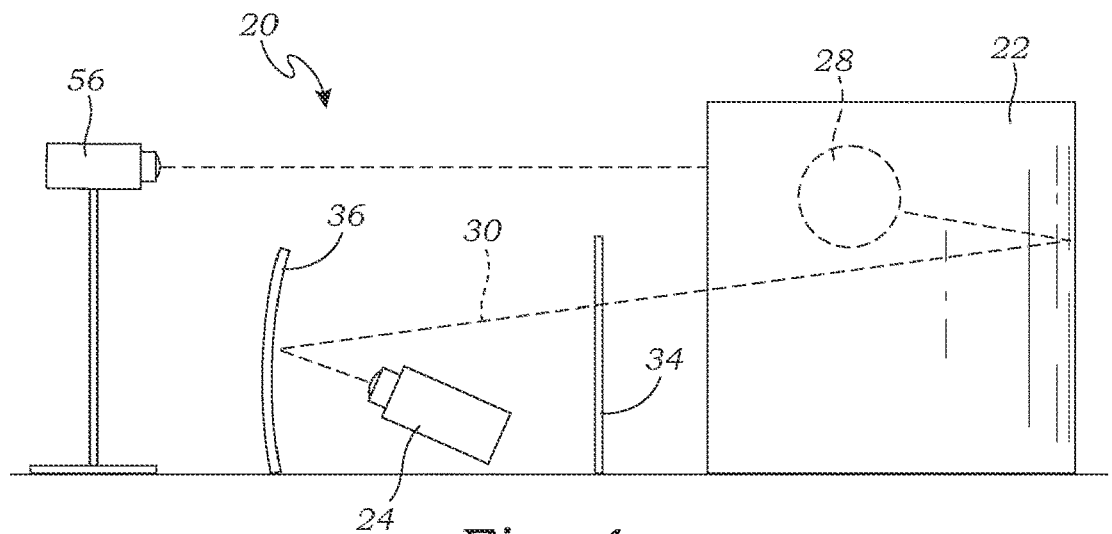
FIG. 4 is a side view thereof.
Figure 5:
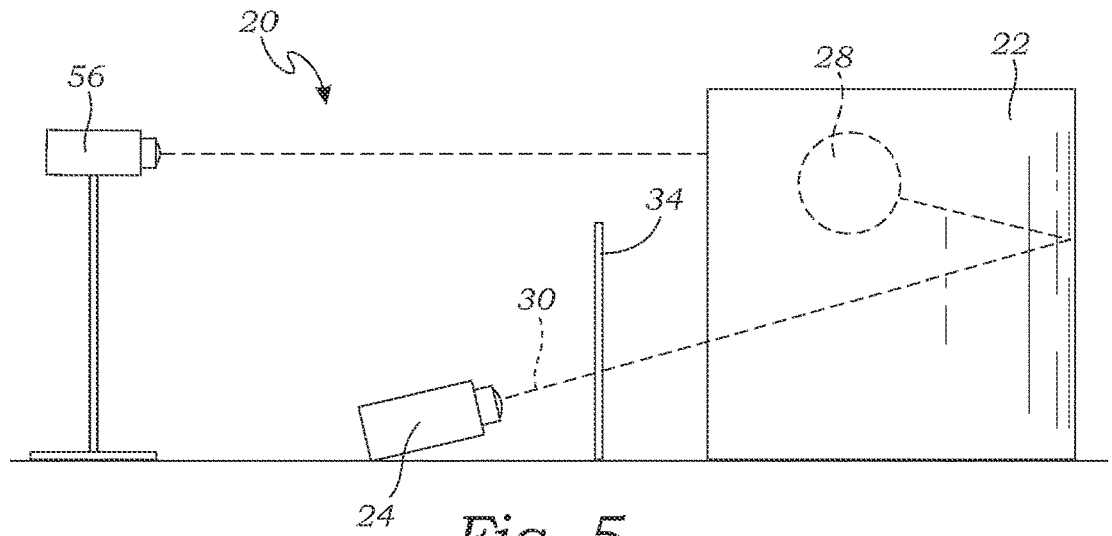
FIGS. 5 and 6 are side views of still further exemplary holographic projection systems, in accordance with at least one embodiment.

Additionally, in at least one embodiment, depending on the size of the area in which the system 20 is to be utilized, an at least one mirror 36 may be positioned substantially between the at least one primary image source 24 and the reflector 22 (i.e., as defined by the path of the at least one light ray 30 emanating from the at least one primary image source 24), such that the at least one light ray 30 from the primary image source 24 reflects off of the mirror 36 before being reflected off of the reflector 22. Thus, in at least one such embodiment, as illustrated in FIGS. 3 and 4, the primary image source 24 may be positioned between the mirror 36 and the reflector 22, with the primary image source 24 oriented in a direction substantially away from the reflector 22 and the mirror 36 oriented in a direction substantially facing the reflector 22. In at least one such further embodiment (not shown), the primary image source 24 may be oriented in a direction substantially orthogonal to the direction of the reflector 22, with the mirror 36 appropriately angled to direct the light rays 30 from the primary image source 24 to the reflector 22. Thus, utilization of the mirror 36 allows for the at least one primary image source 24 to be positioned relatively closer to the reflector 22 while also lengthening the path of the at least one light ray 30 emanating from the associated primary image source 24, which increases the size of the hologram 28 without having to position the associated primary image source 24 itself relatively further from the reflector 22. Utilization of the mirror 36 in this way also preserves the strength of the light ray 30, which results in a relatively brighter hologram 28. In at least one embodiment, the at least one mirror 36 is a concave mirror. In at least one alternate embodiment, the at least one mirror 36 is a plane mirror. In at least one further alternate embodiment, the at least one mirror 36 is a convex mirror. It has been found that a mirror 36 having a concave shape often causes the hologram 28 to be brighter but also relatively smaller, while a mirror 36 having a planar shape causes the hologram 28 to be relatively dimmer but also relatively larger size. In that regard, it should be noted that the sizes, shapes, dimensions and quantities of the at least one mirror 36—as well as the positions of the mirror 36 relative to the at least one primary image source 24 and the reflector 22—as depicted in the drawings (and as described herein) are merely exemplary. In further embodiments, the mirror 36 may take on any other size, shape, dimensions and/or quantities, now known or later developed, and may be positioned and/or arranged elsewhere relative to the at least one primary image source 24 and the reflector 22, so long as the system 20 is capable of substantially carrying out the functionality described herein. In still further embodiments, as illustrated in FIG. 5, the at least one mirror 36 may be omitted altogether.

As mentioned above, the at least one primary image source 24 may be positioned virtually anywhere relative to the reflector 22, so long as the system 20 is capable of substantially carrying out the functionality described herein. Thus, while the at least one primary image source 24 is depicted in the drawings as being positioned nearest to a bottom end 38 of the reflector 22, in further embodiments, the at least one primary image source 24 (along with the projection film 34 and/or at least one mirror 36, in at least one such embodiment) may be positioned nearest a top end 40 of the reflector 22, or anywhere in between.

In at least one embodiment, as illustrated in FIG. 7, one or more of the various components of the system 20 described herein may be incorporated into a housing 42, which can be beneficial for increasing the ease with which the system 20 may be transported or otherwise repositioned, as well as better ensuring that the various components of the system 20 are properly arranged and positioned relative to one another during use. Accordingly, while certain components of the system 20 described herein might be depicted in the drawings as being either internal or external to the housing 42, it is intended that each component could be internal to the housing 42 in some embodiments, and external to the housing 42 in other embodiments. Thus, none of the components are intended to be limited to only one or the other. Furthermore, the size, shape and dimensions of the housing 42 as depicted in the drawings (and as described herein) are merely exemplary. In further embodiments, the housing 42 may take on any other size, shape and/or dimensions, now known or later developed, so long as the system 20 is capable of substantially carrying out the functionality described herein.

With continued reference to FIG. 7, in at least one embodiment, the system 20 provides an at least one light source 44 positioned and configured for illuminating at least one of the hologram 28 and the reflector 22, so as to reduce any reflective noise in the hologram 28, thereby enhancing the hologram 28. Additionally, in at least one embodiment, illuminating the reflector 22 can provide an added sense of depth between the hologram 28 and the reflector 22 which, in turn, increases the clarity of the hologram 28 itself. In at least one embodiment, the at least one light source 44 is a blue colored light. However, in further embodiments, the at least one light source 44 may have any other color or shade of color, now known or later developed—dependent at least in part on the desired use of the system 20 and the hologram 28 to be displayed. In at least one embodiment, the at least one light source 44 is positioned proximal the top end 40 of the reflector 22, such as in a hood 46 of the housing 42 for example (FIG. 7). In at least one further embodiment, the at least one light source 44 is positioned proximal the bottom end 38 of the reflector 22, such as in a base 48 of the housing 42 for example. In a least one still further embodiment, the at least one light source 44 is embedded within the reflector 22. In at least one still further embodiment, the at least one light source 44 is positioned behind the reflector 22. Thus, it will be appreciated that the at least one light source 44 may take on any other size, shape, dimensions and/or quantities, now known or later developed, and may be positioned and/or arranged anywhere relative to the reflector 22, so long as the system 20 is capable of substantially carrying out the functionality described herein.

In at least one embodiment, the housing 42 provides a front panel 50 positioned and configured for concealing select components of the system 20 that are positioned within the housing 42, such as the at least one primary image source 24, mirror 36 and projection film 34, for example. Additionally, in at least one such embodiment, a top edge 52 of the front panel 50 provides a substantially horizontally-oriented shelf 54 positioned and configured for further concealing the components of the system 20 that are positioned within the housing 42. Depending on the desired use of the system 20 and the hologram 28 to be displayed, the front panel 50 and shelf 54 may serve other purposes as well, as discussed further below. Thus, the sizes, shapes and dimensions of each of the front panel 50 and shelf 54 as depicted in the drawings (and as described herein) are merely exemplary. In further embodiments, the each of the front panel 50 and shelf 54 may take on any other sizes, shapes and/or dimensions, now known or later developed, so long as the system 20 is capable of substantially carrying out the functionality described herein.

Figure 8:
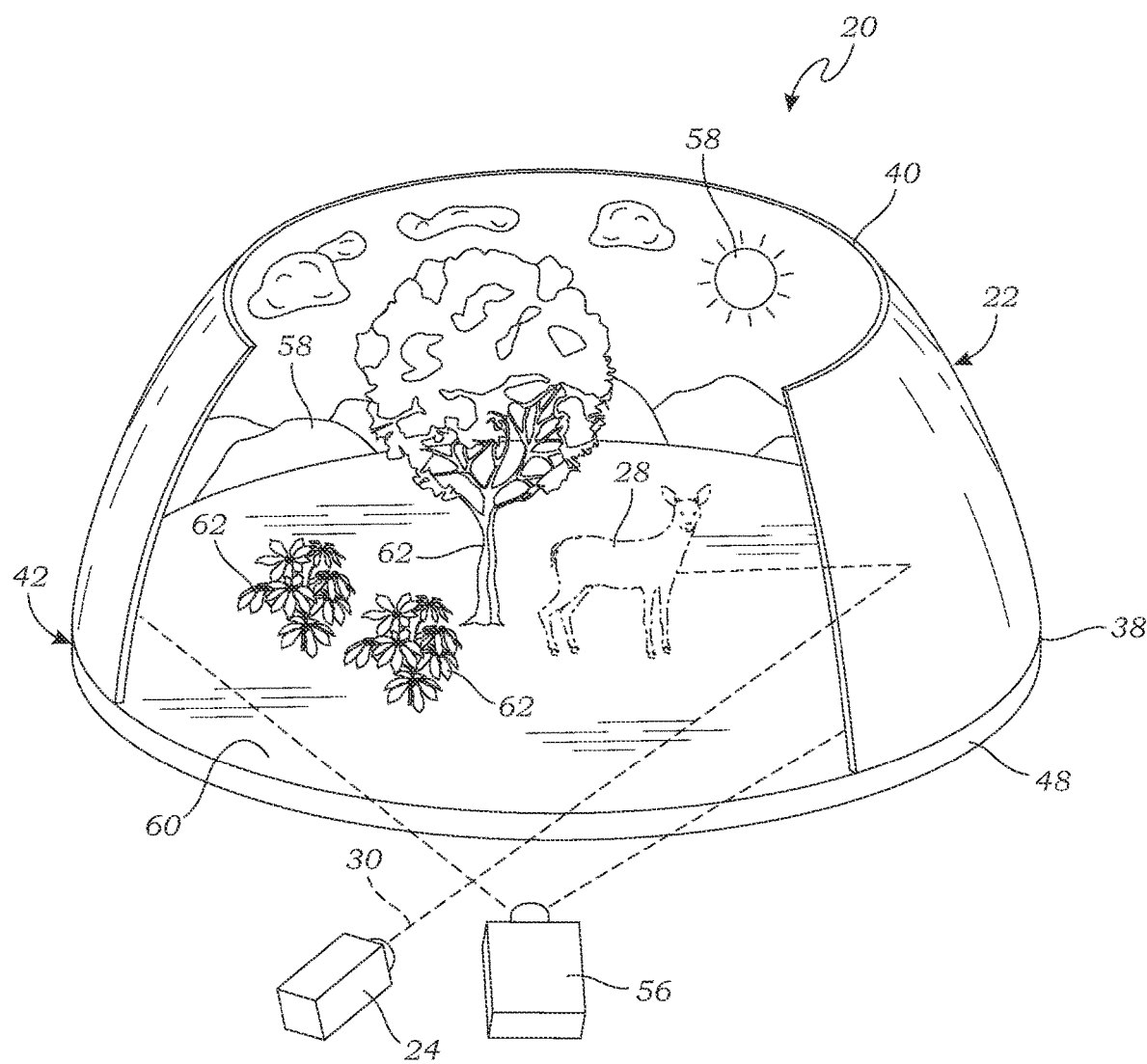

In at least one embodiment, as best illustrated in FIG. 3, the system 20 further provides an at least one secondary image source 56 positioned and configured for generating a secondary image 58 (i.e., both still and moving images, as well as both two-dimensional and three-dimensional images) using light. In at least one such embodiment, the at least one secondary image source 56 is positioned for projecting the secondary image 58 onto the reflector 22 so as to appear as a background image relative to the hologram 28 associated with the primary image 26. In other words, in such embodiments, the at least one secondary image source 56 is positioned and configured for projecting the secondary image 58 onto the reflector 22 at an angle that does not result in the secondary image 58 appearing as a hologram to the observers 32. In at least one further embodiment, as best illustrated in FIG. 8 and discussed further below, the system 20 provides an at least one stage 60, with the at least one secondary image source 56 positioned for projecting the secondary image 58 onto the stage 60—either from below the stage 60 (where the stage 60 is constructed out of a transparent or semi-transparent material) or above the stage 60. In at least one embodiment, a top surface of the stage 60 is reflective, similar to the reflector 22. In at least one such embodiment, the at least one secondary image 58 helps to reduce any reflective noise in the hologram 28, while also adding further visual elements to enhance the realism of the hologram 28. Similar to the at least one primary image source 24, the at least one secondary image source 56 may be positioned virtually anywhere relative to the reflector 22 and/or stage 60, so long as the system 20 is capable of substantially carrying out the functionality described herein. Additionally, similar to the at least one primary image source 24, in at least one embodiment, the at least one secondary image source 56 is a projector. In at least one alternate embodiment, the at least one secondary image source 56 is a display screen—or a device that provides a display screen. In at least one still further embodiment, where the reflector 22 is a curved television having a reflective display screen, the at least one secondary image source 56 and the reflector 22 are one and the same, with the curved television displaying the secondary image 58 directly. In still further embodiments, the at least one secondary image source 56 may be any other device (or combination of devices), now known or later developed, capable of generating the secondary image 58 using light. In at least one embodiment (not shown), the computing device is in communication with the at least one secondary image source 56 for providing the secondary image 58 to be subsequently generated by the secondary image source 56. In at least one further embodiment, the computing device and the at least one secondary image source 56 are one and the same.

In at least one embodiment, as illustrated in FIG. 8, where the system 20 provides an at least one stage 60, the system 20 may incorporate one or more physical props 62 positioned on the stage 60 for adding further visual elements to enhance the realism of the hologram 28, as discussed further below.

In at least one embodiment, as illustrated in FIG. 7, the system 20 further provides an at least one speaker 64 positioned and configured for generating audio associated with the hologram 28 (such as spatial sound, for example) for adding further elements to enhance the realism of the hologram 28. In at least one such embodiment, the at least one speaker 64 is positioned within the housing 42. In at least one embodiment (not shown), the computing device is in communication with the at least one speaker 64 for providing the audio to be subsequently generated by the at least one speaker 64. It should be noted that the sizes, shapes, dimensions, positions, and quantities of the at least one speaker 64 as depicted in the drawings (and as described herein) are merely exemplary. In further embodiments, the at least one speaker 64 may take on any other sizes, shapes, dimensions, positions and/or quantities, now known or later developed, so long as the system 20 is capable of substantially carrying out the functionality described herein.

In at least one embodiment, as also illustrated in FIG. 7, the system 20 further provides an at least one scent emitter 66 positioned and configured for generating an at least one scent associated with the hologram 28 for adding further elements to enhance the realism of the hologram 28. In at least one such embodiment, the at least one scent emitter 66 is positioned within the housing 42. In at least one embodiment (not shown), the computing device is in communication with the at least one scent emitter 66 for providing appropriate instructions to the scent emitter 66 in connection with the at least one scent to be subsequently generated by the at least one scent emitter 66. It should be noted that the sizes, shapes, dimensions, positions, and quantities of the at least one scent emitter 66 as depicted in the drawings (and as described herein) are merely exemplary. In further embodiments, the at least one scent emitter 66 may take on any other sizes, shapes, dimensions, positions and/or quantities, now known or later developed, so long as the system 20 is capable of substantially carrying out the functionality described herein.

In at least one embodiment, the system 20 further provides one or more components that allow the at least one observer 32 to physically interact with the hologram 28. In at least one such embodiment, as also illustrated in FIG. 7, the system 20 provides an at least one substantially outwardly-facing camera 68 positioned and configured for tracking the position and movements of the at least one observer 32 relative to the hologram 28. In at least one such embodiment, the at least one camera 68 is positioned within the housing 42. In at least one embodiment (not shown), the computing device is in communication with the at least one camera 68 for receiving and processing the data obtained by the camera 68. For example, in at least one such embodiment, the system 20 utilizes the at least one camera 68 for allowing the at least one observer 32 to selectively manipulate the hologram 28 using gesture-based input controls. Thus, in such an embodiment, the computing device processes the data obtained by the at least one camera 68 to monitor for any of the gesture-based input controls; and upon detecting any such input controls, the computing device manipulates the primary image 26 accordingly (such as rotating the primary image 26 or enlarging the primary image 26, for example), as projected by the at least one primary image source 24. It should be noted that the sizes, shapes, dimensions, positions, and quantities of the at least one camera 68 as depicted in the drawings (and as described herein) are merely exemplary. In further embodiments, the at least one camera 68 may take on any other sizes, shapes, dimensions, positions and/or quantities, now known or later developed, so long as the system 20 is capable of substantially carrying out the functionality described herein. For example, in at least one embodiment, the at least one camera 68 is an infrared LED camera/sensor.

With continued reference to FIG. 7, in at least one embodiment, the system 20 further provides an at least one ultrasonic emitter 70 positioned and configured for selectively emitting ultrasonic waves in order to provide non-contact, volumetric haptic feedback associated with the hologram 28 for adding further elements to enhance the realism of the hologram 28. Such haptic feedback allows the at least one observer 32 to "touch" and "feel" the hologram 28. In at least one such embodiment, the at least one ultrasonic emitter 70 is positioned within the housing 42. In at least one embodiment (not shown), the computing device is in communication with each of the at least one camera 68 and the at least one ultrasonic emitter 70. The computing device utilizes the data obtained by the at least one camera 68 with respect to the position and movements of the at least one observer 32 relative to the hologram 28, and subsequently provides appropriate instructions to the at least one ultrasonic emitter 70 for generating corresponding ultrasonic waves in response to the observer's 32 position and movements. Thus, when combined with the gesture-based input controls discussed above, in at least one embodiment, the at least one observer 32 is able to physically interact with the hologram 28, and "feel" the hologram 28 in the process. It should be noted that the sizes, shapes, dimensions, positions, and quantities of the at least one ultrasonic emitter 70 as depicted in the drawings (and as described herein) are merely exemplary. In further embodiments, the at least one ultrasonic emitter 70 may take on any other sizes, shapes, dimensions, positions and/or quantities, now known or later developed, so long as the system 20 is capable of substantially carrying out the functionality described herein.

With continued reference to FIG. 7, in at least one embodiment, the system 20 further provides an at least one microphone 72 positioned and configured for capturing audio of the at least one observer 32. In at least one such embodiment, the at least one microphone 72 is positioned within the housing 42. In at least one embodiment (not shown), the computing device is in communication with the at least one microphone 72 for receiving and processing the audio obtained by the microphone 72. For example, in at least one such embodiment, the system 20 utilizes the at least one microphone 72 for allowing the at least one observer 32 to selectively manipulate the hologram 28 using voice-based input controls. Thus, in such an embodiment, the computing device processes the audio obtained by the at least one microphone 72 to monitor for any of the voice-based input controls; and upon detecting any such input controls, the computing device manipulates the primary image 26 accordingly (such as rotating the primary image 26 or enlarging the primary image 26, for example), as projected by the at least one primary image source 24. It should be noted that the sizes, shapes, dimensions, positions, and quantities of the at least one microphone 72 as depicted in the drawings (and as described herein) are merely exemplary. In further embodiments, the at least one microphone 72 may take on any other sizes, shapes, dimensions, positions and/or quantities, now known or later developed, so long as the system 20 is capable of substantially carrying out the functionality described herein.

In at least one further embodiment, the system 20 may provide any other type of input device, now known or later developed, capable of allowing the at least one observer 32 to manipulate the hologram 28 or otherwise control the system 20. Examples of such input devices may include—but are in no way limited to—a mouse, a keyboard, a joystick, a video game controller, a spherical mouse, a touchscreen, a light pen, a tablet computer, a smartphone, etc.

Thus, in at least one embodiment, these various components enable the system 20 to create a full sensory-enabled experience for the at least one observer 32. Not only is the observer 32 able to view the hologram 28 in front of them, but they are also able to hear the hologram 28 (via the at least one speaker 64), touch and feel the hologram 28 (via the at least one ultrasonic emitter 70), smell the hologram 28 (via the at least one scent emitter 66), and physically manipulate the hologram 28 (via the at least one camera 68). By combining some or all of these senses into the system 20 via the various components, the observer 32 can have the closest thing to teleporting and interacting with virtual items in the real world—without any physical barriers or visual accessories like glasses, goggles or headsets between the observer 32 and the virtual items—blurring the lines of reality.

In at least one embodiment, the system 20 further provides an at least one transceiver (not shown) configured for allowing the system 20 to communicate with further instances of the system 20. For example, two instances of the system 20 could be located remote from one another, yet be able to communicate with one another. In at least one embodiment, such communications could involve transmitting a primary image 26 from a first system 20 to a second system 20, where the primary image 26 is subsequently displayed as a hologram 28 on the second system 20. Specific examples of such uses are discussed in detail below. In at least one such embodiment, the at least one transceiver is positioned within the computing device.

In that regard, it should be noted that communication between the computing device and each of the various components of the system 20 described herein may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes.

It should also be noted that the various components of the various embodiments of the system 20 shown and described herein may be mixed and matched in any and every possible combination. For example, in the embodiment of FIG. 7, rather than the primary image source 24 being a projector, it may instead be a display screen in at least one further such embodiment; in which case, the projection film 34 may be omitted in at least one such further embodiment. As another example, in the embodiment of FIG. 7, the housing 42 may incorporate a stage 60 in at least one further such embodiment.

As mentioned above, the system 20 may be utilized in a variety of contexts. In fact, the range of contexts and applications is quite broad, as the system 20 may be utilized in virtually any context where holographic images are desired.

In at least one embodiment, the system 20 could be utilized in the general context of advertising. In such embodiments, instances of the system 20 could be placed in locations such as shopping malls, airports, and other areas with consumer foot traffic. By using programmed video content, the system 20 could display holograms 28 of virtual consumer goods—such as shoes, for example—attracting shoppers to particular products. In another such embodiment, the hologram 28 could be of a food item, such as a cheeseburger, with the at least one scent emitter 66 configured for emitting the scent of the cheeseburger. In yet another such embodiment, the hologram 28 could be of a mannequin (or even a digital rendering of the observer 32) modeling clothing items for sale in a retail store. In a still further embodiment, the computing device (in combination with the at least one camera 68) could be configured for analyzing the at least one observer 32 (i.e., determining age, gender, number of observers 32, etc.) and generating an appropriate hologram 28 using targeted advertising algorithms. In at least one such embodiment, the computing device may also utilize the camera 68 to gather advertising data through monitoring interactions between each observer 32 and the system 20—for example, how many observers 32 interacted with the system 20, how long each observer 32 interacted with the system 20, the demographic of each observer 32, etc.

In at least one further embodiment, the system 20 could be utilized in the general context of projecting a live or recorded person (or virtual person/avatar) as a hologram 28, which could be desired in a variety of specific contexts. For example, the system 20 could project a person as a hologram 28 so that the person may give a speech or presentation to a live audience of observers 32 who are local to the system 20. In at least one further such embodiment, the person's image (as the primary image 26) and audio could be broadcast to a plurality of systems 20 in different locations (such as directly into observers' 32 homes, for example), so that the hologram 28 of the person may give a speech or presentation to observers 32 in multiple locations simultaneously. In at least one such embodiment, where the person is giving a presentation, the at least one secondary image source 56 could be configured for displaying any accompanying presentation media (such as a slide deck, for example) on the reflector 22 behind the hologram 28. Additionally, in at least one such embodiment, the front panel 50 and shelf 54 of the housing 42 could be configured to resemble a podium, lectern or desk, with the hologram 28 being the upper torso of the person (as if they are standing behind the podium/lectern, or sitting behind the desk). As another example, the system 20 could be used in a telecommuting work environment, where the front panel 50 and shelf 54 of the housing 42 are configured to resemble a desk, and a hologram 28 of an employee working from home (or another remote location) is projected as if they are sitting behind the desk. In at least one such embodiment, the employee may have a separate instance of the system 20 locally, with the camera 68 of their system 20 capturing their image (and the microphone 72 of their system 20 capturing their audio) to be transmitted and projected holographically via the system 20 located at the office. Additionally, the employee's instance of the system 20 may project a hologram 28 of another coworker being captured by the camera 68 of the system 20 located at the office or elsewhere.

As yet another example, the system 20 could be utilized as a video communication or video conference solution—in other words, a three-dimensional holographic telecommunication system. In at least one such embodiment, each participant could have an instance of the system 20 local to them, so that the camera 68 of their system 20 could capture their image (and the microphone 72 of their system 20 could capture their audio), with their image (as the primary image 26) and audio being transmitted to the system(s) 20 of the other participant(s) to be displayed as a hologram 28 (with the audio being output via the at least one speaker 64). In at least one such embodiment, the associated computing device is configured for wiping the background captured by the camera 68, such that only the image of the person is transmitted and subsequently projected as a hologram 28. In this way, a dark background (or any other type of background) could be digitally inserted by the computing device prior to the primary image 26 being projected as a hologram 28. In at least one further embodiment, the system 20 could be used to obtain a three-dimensional scan of a real object, then transmit that scan to another instance of the system 20, where the scan would then be projected as a hologram 28.

In at least one still further embodiment, the system 20 could be utilized in the general context of digital assistants. In at least one such embodiment, the computing device of the system 20 could incorporate the necessary software for an artificially intelligent digital assistant to execute thereon. The at least one observer 32 could utilize the system 20 as a digital assistant by providing voice-based input controls via the microphone 72 (similar to traditional digital assistants)—e.g., "show me the weather," "show me my favorite singer," "show me shoe options available for purchase," etc. and subsequently receiving appropriate audio-based feedback from the digital assistant via the at least one speaker 64, as well as visual-based feedback via the hologram 28. In at least one such embodiment, the at least one observer 32 could be presented with an avatar of the digital assistant projected as a hologram 28.

In at least one still further embodiment, the system 20 could be utilized in the general context of displays for educational/informational purposes or otherwise. For example, in at least one such embodiment, an instance of the system 20 could be placed in a museum. By using programmed video content, the system 20 could display a hologram 28 of a historic artifact that the at least one observer 32 could then interact with. Additionally, in at least one such embodiment, the front panel 50 and shelf 54 of the housing 42 could be configured to resemble a pedestal or other display support structure, such that the hologram 28 would appear to be resting on (or hovering over) the structure.

In at least one still further embodiment, the system 20 could be utilized in the general context of stage 60 performances (on virtually any scale), as illustrated best in FIG. 8. For example, in at least one such embodiment, the system 20 could be utilized for a theatrical performance, or a musical performance, or any other type of audio-visual display that could be performed with a stage 60. In such embodiments, the hologram 28 could be positioned to appear as though it is supported by the stage 60 (such as standing on or walking across the stage 60, for example). Furthermore, multiple holograms 28 could be generated by the system 20—for example, if there are multiple performers. Additionally, as mentioned above, the system 20 may incorporate one or more physical props 62 positioned on the stage 60 for adding further visual elements to enhance the realism of the hologram 28. As also mentioned above, the at least one secondary image source 56 could be positioned and configured for projecting a secondary image 58 onto the reflector 22 so as to appear as a background image relative to the hologram 28, and could also be positioned and configured for projecting a secondary image 58 onto the stage 60 for changing the look of the stage 60 or otherwise adding additional visual elements. In at least one such embodiment, the reflector 22 may be generally quarter-spherical in shape, similar to FIG. 8; however, in further embodiments, the reflector 22 may take on other shapes, sizes and/or dimensions. In further such embodiments, the stage 60 may be omitted. In at least one embodiment, depending on the size of the system 20 (i.e., the size of the performance area where the hologram 28 is to be displayed), the at least one primary image source 24 and/or the at least one secondary image source 56 may be selectively and automatically moveable so as to reposition the associated primary and secondary images 26 and 58 as needed—for example, where the hologram 28 needs to traverse across a relatively large stage 60 during the performance.

As yet another example, the system 20 could be sized for allowing the at least one observer 32 to walk on the stage 60 and interact with the hologram 28. Such embodiments could be used in more contexts than just stage 60 performances. For example, a "walk-in" version of the system 20 could be used in various learning, engineering and communication contexts. In at least one such embodiment, the system 20 could be used as a personal computing system with interactive holographic display capabilities, thereby creating a "spatial computing" system.

In still further embodiments, the system 20 could be utilized in a variety of other contexts, including but in no way limited to: video game systems; educational/classroom systems; engineering and design systems; heads up display ("HUD") systems for vehicles and other devices; home entertainment systems; mapping systems; military planning systems; restaurant menu systems; artificially intelligent greeters or concierge workers.

It should be noted that the above non-limiting examples are intended to be a mere subset of all possible contexts in which the system 20 may be utilized and are simply being provided to illustrate the wide variety of those contexts. Thus, these examples should not be construed to limit any of the embodiments described in the present specification. Ultimately, again, the system 20 may be utilized in virtually any context where holographic images are desired. Furthermore, again, in at least one embodiment, the system 20 is capable of cost-effectively generating such "real image" holographic images, thereby making hologram 28s economically viable for mass adoption.

Aspects of the present specification may also be described as the following embodiments:

1. A holographic projection system comprising: an at least one primary image source configured for projecting a primary image via an at least one light ray; a computing device in communication with the at least one primary image source and configured for providing the primary image to be subsequently projected by the at least one primary image source; and a curved reflector positioned and configured for receiving and reflecting the at least one light ray toward a focal point of the reflector, the at least one reflected light ray converging at an image point so as to create a hologram of the projected primary image at the image point, said hologram viewable by an at least one observer.

2. The holographic projection system according to embodiment 1, wherein the at least one primary image source is positioned in front of the reflector.

3. The holographic projection system according to embodiments 1-2, wherein the at least one primary image source is positioned behind the reflector.

4. The holographic projection system according to embodiments 1-3, wherein the at least one primary image source is a projector.

5. The holographic projection system according to embodiments 1-4, wherein the at least one primary image source is a display screen.

6. The holographic projection system according to embodiments 1-5, wherein the reflector is constructed out of a reflective material.

7. The holographic projection system according to embodiments 1-6, wherein the reflector is coated with a reflective substance.

8. The holographic projection system according to embodiments 1-7, wherein the reflector is a curved television having a reflective display screen.

9. The holographic projection system according to embodiments 1-8, wherein the reflector is relatively dark in color.

10. The holographic projection system according to embodiments 1-9, wherein the reflector is transparent or translucent, with a relatively dark colored background material positioned directly behind the reflector.

11. The holographic projection system according to embodiments 1-10, wherein the primary image contains a relatively dark background color.

12. The holographic projection system according to embodiments 1-11, wherein the reflector has one of a spherical, semi-spherical, quarter-spherical, cylindrical, partial cylindrical, or conical shape.

13. The holographic projection system according to embodiments 1-12, further comprising a projection film positioned substantially between the at least one primary image source and the reflector, such that the at least one light ray from the at least one primary image source passes through the projection film before being reflected by the reflector.

14. The holographic projection system according to embodiments 1-13, wherein the projection film is relatively dark in color.

15. The holographic projection system according to embodiments 1-14, wherein the projection film has one of a substantially planar or substantially curved shape.

16. The holographic projection system according to embodiments 1-15, further comprising an at least one mirror positioned substantially between the at least one primary image source and the reflector, such that the at least one light ray from the at least one primary image source is reflected by the at least one mirror before being reflected by the reflector.

17. The holographic projection system according to embodiments 1-16, wherein: the at least one primary image source is oriented in a direction substantially away from the reflector; and the at least one mirror is oriented in a direction substantially facing the reflector.

18. The holographic projection system according to embodiments 1-17, wherein: the primary image source is oriented in a direction substantially orthogonal to a direction of the reflector; and the at least one mirror is appropriately angled to direct the at least one light ray from the at least one primary image source to the reflector.

19. The holographic projection system according to embodiments 1-18, wherein each of the at least one mirror is one of a plane mirror, a concave mirror, or a convex mirror.

20. The holographic projection system according to embodiments 1-19, further comprising a housing sized and configured for supporting at least one of the at least one primary image source, computing device, and reflector therewithin.

21. The holographic projection system according to embodiments 1-20, wherein the housing provides a front panel positioned and configured for concealing the at least one primary image source positioned within the housing.

22. The holographic projection system according to embodiments 1-21, wherein a top edge of the front panel provides a substantially horizontally-oriented shelf positioned and configured for further concealing the at least one primary image source.

23. The holographic projection system according to embodiments 1-22, further comprising an at least one light source positioned and configured for illuminating at least one of the hologram and the reflector.

24. The holographic projection system according to embodiments 1-23, wherein the at least one light source is a blue colored light.

25. The holographic projection system according to embodiments 1-24, further comprising an at least one secondary image source positioned and configured for projecting a secondary image onto the reflector so as to appear as a background image relative to the hologram.

26. The holographic projection system according to embodiments 1-25, wherein the at least one secondary image source is a projector.

27. The holographic projection system according to embodiments 1-26, wherein the at least one secondary image source is a display screen.

28. The holographic projection system according to embodiments 1-27, wherein the computing device is in communication with the at least one secondary image source and configured for providing the secondary image to be subsequently projected by the at least one secondary image source.

29. The holographic projection system according to embodiments 1-28, further comprising an at least one stage constructed out of a transparent or semi-transparent material, the at least one stage positioned between the at least one primary image source and the reflector, such that the at least one light ray from the at least one primary image source passes through the at least one stage before being reflected by the reflector.

30. The holographic projection system according to embodiments 1-29, wherein a top surface of the at least one stage is reflective.

31. The holographic projection system according to embodiments 1-30, further comprising an at least one physical prop positioned on the stage.

32. The holographic projection system according to embodiments 1-31, further comprising an at least one speaker positioned and configured for generating audio associated with the hologram.

33. The holographic projection system according to embodiments 1-32, wherein the computing device is in communication with the at least one speaker and configured for providing the audio to be subsequently generated by the at least one speaker.

34. The holographic projection system according to embodiments 1-33, further comprising an at least one scent emitter positioned and configured for generating an at least one scent associated with the hologram.

35. The holographic projection system according to embodiments 1-34, wherein the computing device is in communication with the at least one scent emitter and configured for providing appropriate instructions in connection with the at least one scent to be subsequently generated by the at least one scent emitter.

36. The holographic projection system according to embodiments 1-35, further comprising an at least one substantially outwardly-facing camera positioned and configured for tracking the position and movements of the at least one observer relative to the hologram.

37. The holographic projection system according to embodiments 1-36, wherein the computing device is in communication with the at least one camera and configured for: receiving, from the at least one camera, data associated with the position and movements of the at least one observer relative to the hologram; determining whether said data contains an at least one gesture-based input control; and upon identifying the presence of an at least one gesture-based input control, manipulating the primary image in accordance with said at least one gesture-based input control.

38. The holographic projection system according to embodiments 1-37, further comprising an at least one ultrasonic emitter positioned and configured for selectively emitting ultrasonic waves in order to provide non-contact, volumetric haptic feedback associated with the hologram.

39. The holographic projection system according to embodiments 1-38, wherein the computing device is in communication with each of the at least one camera and the at least one ultrasonic emitter, the computing device configured for: receiving, from the at least one camera, data associated with the position and movements of the at least one observer relative to the hologram; and providing appropriate instructions to the at least one ultrasonic emitter for generating corresponding ultrasonic waves in response to the observer's position and movements relative to the hologram.

40. The holographic projection system according to embodiments 1-39, further comprising an at least one microphone positioned and configured for capturing audio of the at least one observer.

41. The holographic projection system according to embodiments 1-40, wherein the computing device is in communication with the at least one microphone and configured for: receiving audio from the at least one microphone; determining whether said audio contains an at least one voice-based input control; and upon identifying the presence of an at least one voice-based input control, manipulating the primary image in accordance with said at least one voice-based input control.

42. The holographic projection system according to embodiments 1-41, further comprising an at least one transceiver configured for allowing the system to communicate with an at least one further instance of the system.

43. A holographic projection system comprising: an at least one primary image source configured for projecting a primary image via an at least one light ray; a computing device in communication with the at least one primary image source and configured for providing the primary image to be subsequently projected by the at least one primary image source; a curved reflector positioned and configured for receiving and reflecting the at least one light ray toward a focal point of the reflector, the at least one reflected light ray converging at an image point so as to create a hologram of the projected primary image at the image point, said hologram viewable by an at least one observer; a projection film positioned between the at least one primary image source and the reflector, such that the at least one light ray from the at least one primary image source passes through the projection film before being reflected by the reflector; and an at least one light source positioned and configured for illuminating at least one of the hologram and the reflector.

44. A holographic projection system comprising: an at least one primary image source configured for projecting a primary image via an at least one light ray; a curved reflector positioned and configured for receiving and reflecting the at least one light ray toward a focal point of the reflector, the at least one reflected light ray converging at an image point so as to create a hologram of the projected primary image at the image point, said hologram viewable by an at least one observer; an at least one secondary image source positioned and configured for projecting a secondary image onto the reflector so as to appear as a background image relative to the hologram; and a computing device in communication with each of the at least one primary image source and secondary image source, the computing device configured for providing each of the primary image and secondary image to be subsequently projected by the at least one primary image source and secondary image source, respectively.

In closing, regarding the exemplary embodiments of the present invention as shown and described herein, it will be appreciated that a holographic projection system is disclosed and configured for cost-effectively generating "real image" holographic images. Because the principles of the invention may be practiced in a number of configurations beyond those shown and described, it is to be understood that the invention is not in any way limited by the exemplary embodiments, but is generally directed to a holographic projection system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived". The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A holographic projection system comprising:
    an at least one primary image source configured for projecting a primary image via an at least one light ray;
    a computing device in communication with the at least one primary image source and configured for providing the primary image to be subsequently projected by the at least one primary image source; and
    a curved reflector positioned and configured for receiving and reflecting the at least one light ray toward a focal point of the reflector, the at least one reflected light ray converging at an image point positioned a distance in front of the reflector, between an at least one observer and the reflector, so as to create a hologram of the projected primary image at the image point.

2. The holographic projection system of claim 1, wherein the reflector is relatively dark in color.

3. The holographic projection system of claim 1, wherein the primary image contains a relatively dark background color.

4. The holographic projection system of claim 1, wherein the reflector has one of a spherical, semi-spherical, quarter-spherical, cylindrical, partial cylindrical, or conical shape.

5. The holographic projection system of claim 1, further comprising a projection film positioned substantially between the at least one primary image source and the reflector, such that the at least one light ray from the at least one primary image source passes through the projection film before being reflected by the reflector.

6. The holographic projection system of claim 1, further comprising an at least one mirror positioned substantially between the at least one primary image source and the reflector, such that the at least one light ray from the at least one primary image source is reflected by the at least one mirror before being reflected by the reflector.

7. The holographic projection system of claim 1, further comprising an at least one light source positioned and configured for illuminating at least one of the hologram and the reflector.

8. The holographic projection system of claim 7, wherein the at least one light source is a blue colored light.

9. The holographic projection system of claim 1, further comprising an at least one secondary image source positioned and configured for projecting a secondary image onto the reflector so as to appear as a background image relative to the hologram.

10. The holographic projection system of claim 1, further comprising an at least one stage constructed out of a transparent or semi-transparent material, the at least one stage positioned between the at least one primary image source and the reflector, such that the at least one light ray from the at least one primary image source passes through the at least one stage before being reflected by the reflector.

11. The holographic projection system of claim 1, further comprising an at least one speaker positioned and configured for generating audio associated with the hologram.

12. The holographic projection system of claim 1, further comprising an at least one scent emitter positioned and configured for generating an at least one scent associated with the hologram.

13. The holographic projection system of claim 1, further comprising an at least one substantially outwardly-facing camera positioned and configured for tracking the position and movements of the at least one observer relative to the hologram.

14. The holographic projection system of claim 13, wherein the computing device is in communication with the at least one camera and configured for:
    receiving, from the at least one camera, data associated with the position and movements of the at least one observer relative to the hologram;
    determining whether said data contains an at least one gesture-based input control; and upon identifying the presence of an at least one gesture-based input control, manipulating the primary image in accordance with said at least one gesture-based input control.

15. The holographic projection system of claim 13, further comprising an at least one ultrasonic emitter positioned and configured for selectively emitting ultrasonic waves in order to provide non-contact, volumetric haptic feedback associated with the hologram.

16. The holographic projection system of claim 15, wherein the computing device is in communication with each of the at least one camera and the at least one ultrasonic emitter, the computing device configured for:
   receiving, from the at least one camera, data associated with the position and movements of the at least one observer relative to the hologram; and
   providing appropriate instructions to the at least one ultrasonic emitter for generating corresponding ultrasonic waves in response to the observer's position and movements relative to the hologram.

17. The holographic projection system of claim 1, further comprising an at least one microphone positioned and configured for capturing audio of the at least one observer.

18. The holographic projection system of claim 17, wherein the computing device is in communication with the at least one microphone and configured for:
   receiving audio from the at least one microphone;
   determining whether said audio contains an at least one voice-based input control; and
   upon identifying the presence of an at least one voice-based input control, manipulating the primary image in accordance with said at least one voice-based input control.

19. A holographic projection system comprising:
   an at least one primary image source configured for projecting a primary image via an at least one light ray;
   a computing device in communication with the at least one primary image source and configured for providing the primary image to be subsequently projected by the at least one primary image source;
   a curved reflector positioned and configured for receiving and reflecting the at least one light ray toward a focal point of the reflector, the at least one reflected light ray converging at an image point positioned a distance in front of the reflector, between an at least one observer and the reflector, so as to create a hologram of the projected primary image at the image point;
   a projection film positioned between the at least one primary image source and the reflector, such that the at least one light ray from the at least one primary image source passes through the projection film before being reflected by the reflector; and
   an at least one light source positioned and configured for illuminating at least one of the hologram and the reflector.

20. A holographic projection system comprising:
   an at least one primary image source configured for projecting a primary image via an at least one light ray;
   a curved reflector positioned and configured for receiving and reflecting the at least one light ray toward a focal point of the reflector, the at least one reflected light ray converging at an image point positioned a distance in front of the reflector, between an at least one observer and the reflector, so as to create a hologram of the projected primary image at the image point;
   an at least one secondary image source positioned and configured for projecting a secondary image onto the reflector so as to appear as a background image relative to the hologram; and
   a computing device in communication with each of the at least one primary image source and secondary image source, the computing device configured for providing each of the primary image and secondary image to be subsequently projected by the at least one primary image source and secondary image source, respectively.

* * * * *